(12) United States Patent
Patron et al.

(10) Patent No.: US 7,209,957 B2
(45) Date of Patent: Apr. 24, 2007

(54) DOWNLOADABLE CONTROL POLICIES FOR INSTANT MESSAGING USAGE

(75) Inventors: David Patron, Cedar Park, TX (US); Sreenivasa Rao Gorti, Austin, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 239 days.

(21) Appl. No.: 10/662,890

(22) Filed: Sep. 15, 2003

(65) Prior Publication Data

US 2005/0060167 A1    Mar. 17, 2005

(51) Int. Cl.
G06F 15/16    (2006.01)
(52) U.S. Cl. .................... 709/208; 709/203; 709/205; 709/206; 705/1
(58) Field of Classification Search ................ 705/1; 709/203, 208, 206
See application file for complete search history.

(56) References Cited

U.S. PATENT DOCUMENTS

| | | | |
|---|---|---|---|
| 5,550,575 A * | 8/1996 | West et al. ............... 725/28 |
| 2001/0034759 A1 | 10/2001 | Chiles et al. |
| 2002/0049806 A1* | 4/2002 | Gatz et al. ................ 709/203 |
| 2002/0059454 A1 | 5/2002 | Barrett et al. |
| 2002/0065721 A1 | 5/2002 | Lema et al. |
| 2002/0103862 A1 | 8/2002 | Burr |
| 2002/0198940 A1 | 12/2002 | Bower et al. |
| 2003/0063072 A1 | 4/2003 | Brandenberg et al. |
| 2003/0078972 A1 | 4/2003 | Tapissier et al. |
| 2003/0101283 A1 | 5/2003 | Lewis et al. |
| 2003/0101343 A1 | 5/2003 | Eaton et al. |
| 2003/0109271 A1 | 6/2003 | Lewis et al. |
| 2003/0110212 A1 | 6/2003 | Lewis |

FOREIGN PATENT DOCUMENTS

WO    WO 03/058464 A1 *    7/2003

OTHER PUBLICATIONS

Information on CSS Software, Jun. 20, 2003, CSS Software, printed through www.archive.org.*
Matthew T. Pandina, MyIM Plugin For AOL Instant Messenger, Feb. 17, 2003.*
Information On AYTTM, Jun. 4, 2003, printed through www.archive.org.*
Information on AOL Buddy List, Jun. 10, 2001, printed through www.archive.org.*
Parental Controls Geared To Child's Age, Nov. 19, 2002, Journal—Gazette.*

* cited by examiner

Primary Examiner—Naresh Vig
(74) Attorney, Agent, or Firm—Toler Schaffer, LLP

(57) ABSTRACT

A request is received from a parent or guardian of a minor to sign up for an Instant Messaging (IM) service on behalf of the minor. The parent or guardian creates a profile comprising one or more control policies for usage of the IM service by the minor using a Web-based profile administrator interface. Thereafter, a request is received by an IM server from the minor to log on to the IM service using a client device. The IM server communicates information from the profile to the client device to modify the functionality of the client device to comply with at least one policy in the profile.

20 Claims, 3 Drawing Sheets

DOWNLOADABLE CONTROL POLICIES FOR INSTANT MESSAGING USAGE

FIELD OF THE DISCLOSURE

The present disclosure relates to methods and systems for instant messaging (IM).

DESCRIPTION OF THE RELATED ART

Current instant messaging (IM) systems offer limited mechanisms for parental control of a child's IM usage. Some specialized IM devices are tied to a wireless base station that controls access to the Internet. The wireless base station plugs into a host personal computer (PC) that must be powered for the IM devices to access the Internet. Parents deploy the wireless base station and the host PC to enable IM usage at home for their children. The parents set up IM preferences using the host PC, which in turn dictates when the IM devices can access the Internet, with whom users of the IM devices can chat, and which chat rooms can be accessed using the IM devices.

Using specialized IM devices as described above has its shortcomings. Each user is restricted to using a particular IM device for IM applications. Further, security holes result from tying the administration of control policies to the wireless base station. If an end user takes his/her IM device to another location having another base station and another host PC, usage of the IM device is dictated by a different set of IM preferences which may be less restrictive than the preferences stated in the host PC at home.

BRIEF DESCRIPTION OF THE DRAWINGS

The present invention is pointed out with particularity in the appended claims. However, other features are described in the following detailed description in conjunction with the accompanying drawing in which:

DETAILED DESCRIPTION OF THE PREFERRED EMBODIMENTS

Figure 1:
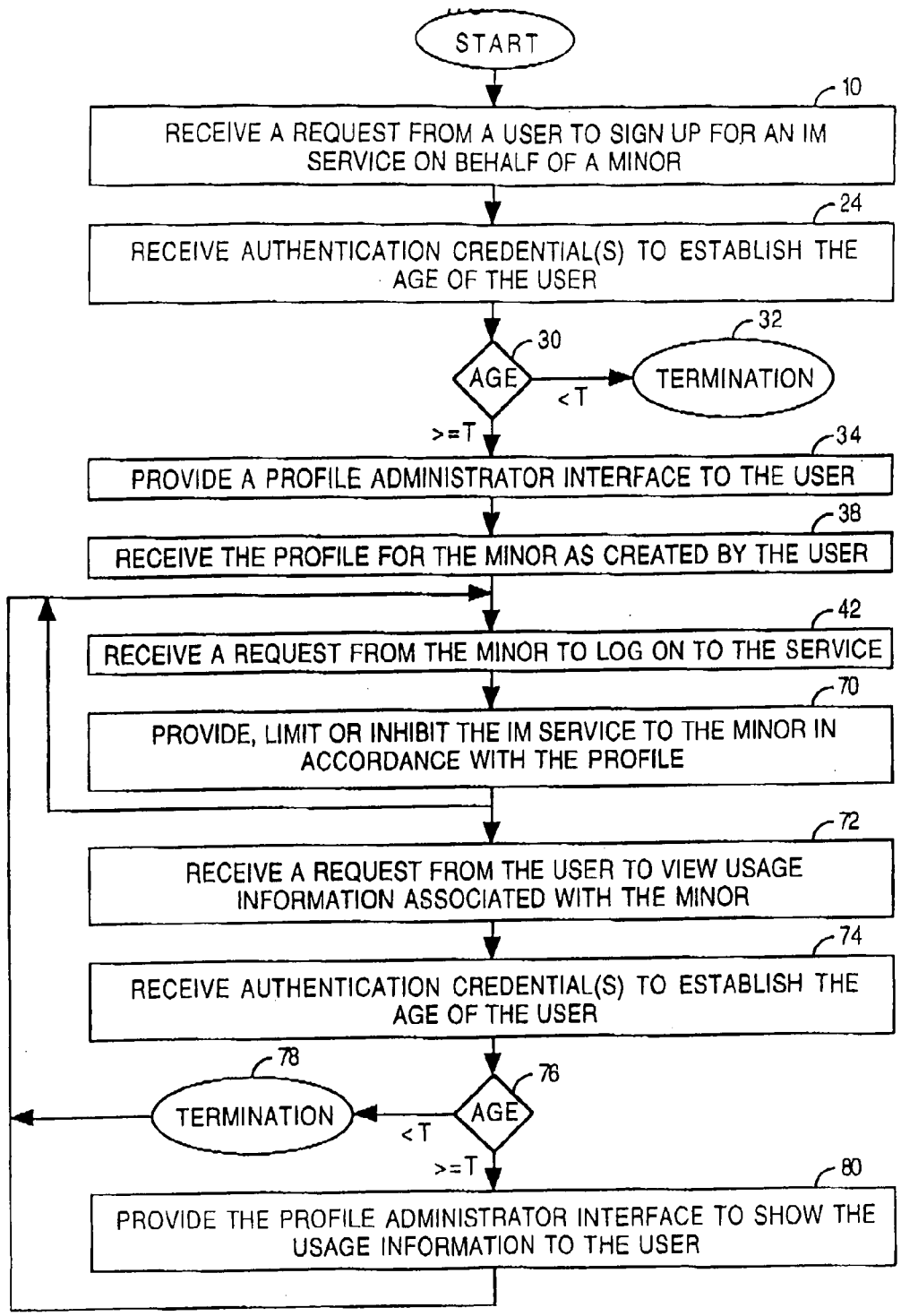
FIG. 1 is a flow chart of an embodiment of a method of controlling IM usage.
Figure 2:
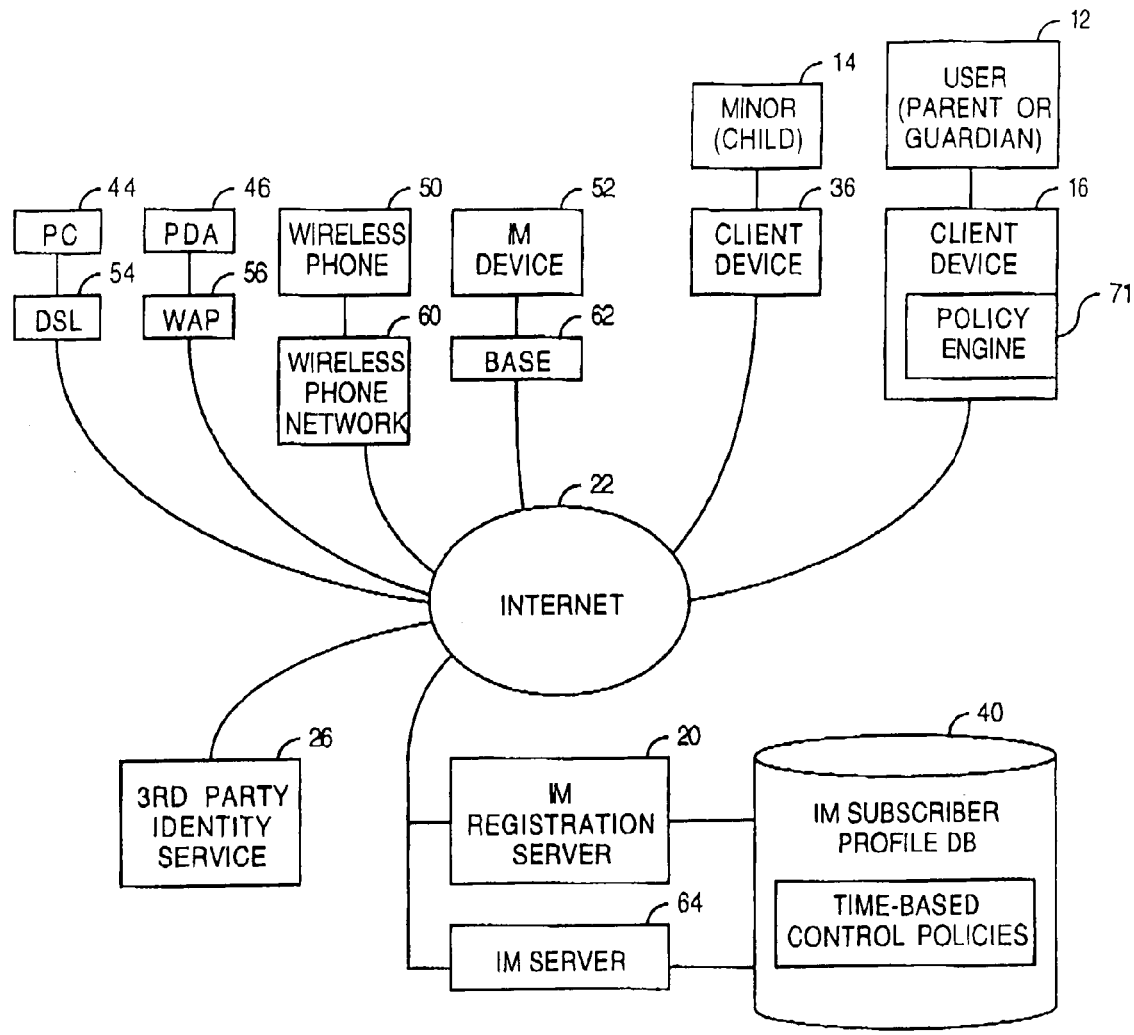
FIG. 2 is a schematic, block diagram of an embodiment of a system to control IM usage.

Embodiments of the present invention are described with reference to FIG. 1, which is a flow chart of an embodiment of a method of controlling IM usage, and FIG. 2, which is a schematic, block diagram of an embodiment of a system to control IM usage.

As indicated by block 10, the method comprises receiving a request from a user 12 to sign up for an IM service on behalf of a minor 14. Typically, the user 12 is a parent or guardian of a child (e.g. a son or a daughter) who is the minor 14. The user 12 makes the request using a client device 16. Examples of the client device 16 include, but are not limited to, a personal computer (PC), a personal digital assistant (PDA), and a wireless telephone. The request is received by an IM registration server 20 via a computer network such as the Internet 22.

As indicated by block 24, the method comprises receiving one or more authentication credentials to establish the age of the user 12. In one embodiment, the age of the user 12 is received via the Internet 22 from a third-party identity service 26 that can vouchsafe therefor. An example of the third-party identity service 26 to which the user 12 has subscribed is provided by Liberty Alliance™. Other ways of establishing the age of the user 12 are based on a driver's license number for the user 12, and whether or not the user 12 has possession of a valid credit card, for example.

As indicated by block 30, the method comprises proceeding with the sign up process if the age of the user 12 is at or above a particular threshold T. The threshold T may be 18 years old or 21 years old, for example. If the age of the user 12 cannot be established, or if the user 12 is not old enough to proceed, a termination message indicating same is provided to the user 12, as indicated by block 32.

As indicated by block 34, the method comprises providing a Web-based profile administrator interface to the user 12. To provide the profile administrator interface, the IM service registration server 20 outputs a computer data signal, such as a signal in a markup language, using a communication protocol. Examples of the markup language include, but are not limited to, hypertext markup language (HTML) and wireless markup language (WML). Examples of the protocol include, but are not limited to, hypertext transfer protocol (HTTP) and wireless access protocol (WAP). The computer data signal is communicated to the client device 16 via the Internet 22.

The client device 16 displays the profile administrator interface based on the computer data signal. Using the profile administrator interface with the client device 16, the user 12 creates a profile for the minor 14. The profile corresponds to an IM handle for the minor 14. The profile can include any combination of the following control policies: (a) times of day, such as hours, when the minor 14 can access the Internet 22 for instant messaging or chat; (b) black lists of other users of the IM service that cannot be reached by the minor 14; (c) white lists of other users of the IM service with which the minor 14 can exclusively communicate; (d) preferred lists of chat rooms that the minor 14 is able to join or not able to join; and (e) parental control-based ratings of chat rooms that the minor 14 can join (e.g. only PG-13 or under chat rooms). The profile can include time-based controls such as: (a) specific times when the minor 14 can or cannot use his/her client device 36; (b) specific times when the minor 14 can log on or cannot log on (e.g. he/she cannot log on during exams in school); (c) specific times when messages from buddies are to be blocked; and (d) specific times when messages from anyone not in the buddy list will be blocked or allowed. In general, any of the aforementioned policies can applied to the minor 14 and/or his/her particular client device 36.

As indicated by block 38, the method comprises receiving the profile for the minor 14 as created by the user 12. The profile is received by the IM service registration server 20 from the client device 16 via the Internet 22. The IM service registration server 20 stores the profile in an IM subscriber profile database 40. The IM subscriber profile database 40 stores profiles for a plurality of IM subscribers. The IM subscriber profile database 40 is depicted to illustrate various time-based control policies included in the various profiles for different IM subscribers. Each of the subscribers may use any combination of one or more of the time-based control policies.

After the profile is created and stored, the IM service is enabled for the minor 14. As indicated by block 42, the method comprises receiving a request from the minor 14 to log on to the IM service. The minor 14 makes the request using either the client device 36 or another client device. Examples of the client devices include, but are not limited to, a PC 44, a PDA 46, a wireless telephone 50 that supports downloadable applications, and a specialized IM device 52. The PC 44 may access the Internet 22 by a digital subscriber line (DSL) 54 or another connection. The PDA 46 may access the Internet 22 by a wireless access point (WAP) 56, such as an 802.11-based or WI-FI WAP. The wireless telephone 50 may access the Internet 22 by a wireless telephone network 60, such as a cellular telephone network, via General Packet Radio Service (GPRS) or another third generation (3G) medium, or a Short Message Service (SMS). The profile of the minor 14 may be tied to the wireless telephone 50 by a license/user identification combination. The specialized IM device 52 may access the Internet 22 by a base station 62, as described herein, using a standard protocol such as 802.11. Regardless of the specific type of client device used by the minor 14, the request is received by an IM server 64 via the Internet 22.

As indicated by block 70, the method comprises providing, limiting or inhibiting the IM service to the minor 14 in accordance with the user-created profile. These acts may comprise any combination of: inhibiting communication between the minor 14 and those users on the black lists; enabling communication exclusively with those users on the white lists; enabling the minor 14 to join chat rooms on the preferred list; inhibiting the minor 14 to join chat rooms not on the preferred list; enabling the minor 14 to join chat rooms based on their ratings; and inhibiting the minor 14 to join chat rooms based on their ratings. These acts may further comprise any combination of: enabling use of the client device 36 during specific allowed times indicated in the profile; inhibiting use of the client device 36 outside of the specific allowed times or during specific black-out times indicated in the profile; enabling the minor 14 to log on during specific allowed times; inhibiting the minor 14 to log on outside of the allowed times or during specific black-out times; blocking messages from buddies during specific black-out times or outside of specific allowed times; and blocking messages from anyone not in the buddy list during specific black-out times or outside of specific allowed times. The times are localized to a subscriber's time zone. Each of the time intervals can be specified as either recurring or a one-time occurrence.

Preferably, the IM server 64 communicates profile information to the client device 36. Based on the profile information, the client device 36 modifies its functionality to comply with the policies. Regardless of the specific type of client device 36, plug-in software components can be used to add the parental control functionality to standard IM clients. Examples of IM clients include, but are not limited to, YAHOO!™ Messenger, AIM™, MSN™ messenger, GAIM™ and JABBER™.

In this way, the policies stored by the IM subscriber profile database 40 are downloaded to the client device 36. A policy engine 71, such as the aforementioned plug-in, running on the client device 36 performs the actual task of verifying all access to ensure compliance with the policies. The policy engine 71 filters incoming and outgoing messages to other IM users or groups based on the policies. The policy engine 71 also may act to send alerts, in the form of e-mails or instant messages, to the parent or guardian user 12 to alert him/her of the activity of the client device 36. In general, the policy engine 71 acts to provide, limit and/or inhibit use of the IM service on the client device 36.

For client devices that cannot be extended, such as an SMS-based telephone, the policy engine may reside at a proxy server rather than at the client devices themselves.

The policy engine 71 may periodically update usage data stored by either the IM server 64 or the IM subscriber profile database 40. In this case, the IM server 64 periodically receives usage data from the client device 36. The usage data may comprise a log of actions taken to ensure compliance with the policies.

Alternatively, the IM server 64 can act to provide, limit and/or inhibit the IM service based on the profile stored in the IM subscriber profile database 40. In this alternative, the IM server 64 monitors the minor's 14 usage of the IM service, and stores associated information that can be subsequently viewed by the user 12. However, use of the policy engine 71 makes the whole system more scaleable to a large number of users than a completely centralized model where servers filter through each incoming/outgoing message to any policy-controlled client device.

Either way, the policy engine 71 of the client device 36 and/or the IM server 64 ensure that the IM service is provided to the minor 14 in compliance with the policies established by the user 12.

As indicated by block 72, the method comprises receiving a request from the user 12 to view the usage information associated with the minor 14. The request is received by the IM service registration server 20 from the client device 16 via the Internet 22.

As indicated by block 74, the method comprises receiving one or more authentication credentials to establish the age of the user 12. This act is similar to the act performed in block 24. The age of the user 12 can be established via the Internet 22 using the third-party identity service 26 that can vouchsafe therefor. Other ways of establishing the age of the user 12 are based on a driver's license number for the user 12, and whether or not the user 12 has possession of a valid credit card, for example.

As indicated by block 76, the method comprises proceeding with the usage information process if the age of the user 12 is at or above a particular threshold T. The threshold T may be 18 years old or 21 years old, for example. If the age of the user 12 cannot be established, or if the user 12 is not old enough to proceed, a termination message indicating same is provided to the user 12, as indicated by block 78.

It is noted that identity-based authorization may be substituted for age-based authorization to determine whether the user 12 can proceed to the profile administrator interface. In this case, based on the identity-based authorization, the system may assert that the user 12 is indeed the parent or guardian of the minor 14. As a result, other adults who are not the parent or guardian of the minor 14 would not be able to authorize use of the client device 36 and/or IM client software by the minor 14.

As indicated by block 80, the method comprises providing the profile administrator interface to the client device 16 of the user. The profile administrator interface displays the various profile information and usage information for the minor 14. Examples of the information include, but are not limited to, buddy lists and chat room history.

The system and method proposed herein allow the minor 14 to use an IM client (which is hardware-based and/or software-based) over many types of networks having connectivity to the Internet 22. The minor's 14 usage is governed by a set of rules specified in a profile associated with the minor 14 and his/her client device 36. The profile is stored in the IM network. The minor 14 is allowed to use the IM service in multiple locations in accordance with the rules specified by the user 12.

For example, consider the user 12 being a parent who sets up a profile for his daughter, the minor 14, to enable her to access an Internet-based service. Whenever the daughter logs into the service after connecting to the Internet, the IM client would receive the profile and modify its functionality to comply with the profile rules. Thus, the daughter would be able to use an IM device in her home using a WI-FI network, and at a public library that provides WI-FI connectivity, both with the same set of preferences and policies set by the parent.

Figure 3:
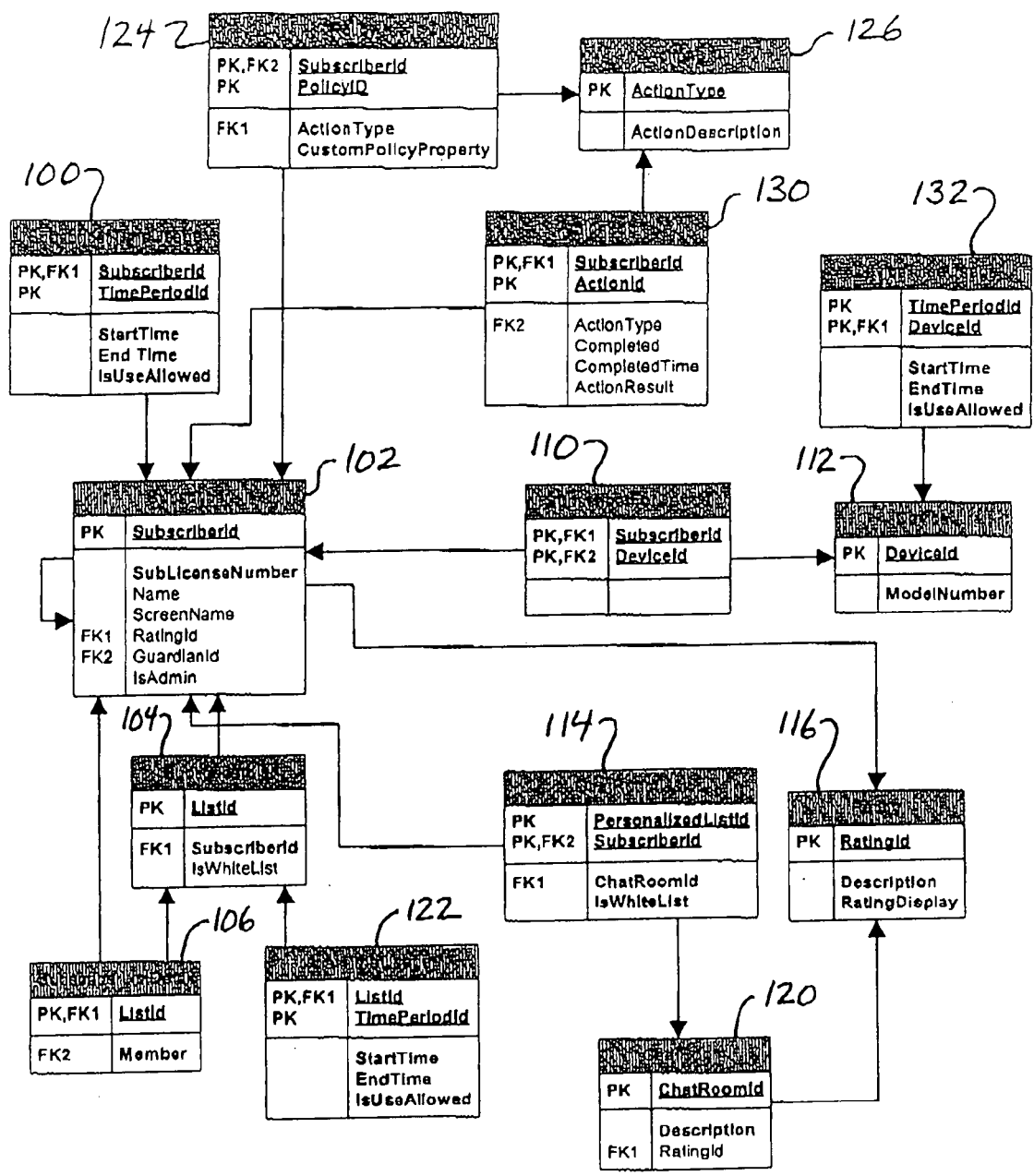
FIG. 3 is a block diagram of a basic data model for the IM subscriber profile database.

FIG. 3 is a block diagram of a basic data model for the IM subscriber profile database 40. The data comprise subscriber time usage data 100, subscriber data 102, subscriber list data 104, subscriber list detail data 106, subscriber for device data 110, device data 112, chat room list data 114, rating data 116, chat room data 120, list time usage data 122, policy data 124, action list data 126, action log data 130 and device time usage data 132.

The subscriber data 102 has a subscriber identifier as a primary key, a subscriber license number, a name, a screen name, a rating identifier as a first foreign key, an identifier of the guardian of the subscriber as a second foreign key, and an indication of whether the subscriber is an administrator. In an example data set wherein the subscriber identifier identifies the minor 14, the subscriber is indicated not to be an administrator. In an example data set wherein the subscriber identifier identifies the user 12, the subscriber is indicated to be an administrator.

The subscriber time usage data 100 comprises the subscriber identifier as a primary key and a foreign key, a time period identifier as a primary key, a start time and an end time to define the time period, and an indication if use is allowed or disallowed in the time period.

The subscriber list data 104 comprises a list identifier as a primary key, the subscriber identifier as a foreign key, and an indication if the list is a white list.

The subscriber list detail data 106 comprises the list identifier as a primary key and a foreign key, and member data as a foreign key. The member data identifies members of the list identified by the list identifier.

The list time usage data 122 comprises the list identifier as a primary key and a foreign key, a time period identifier as a primary key, a start time and an end time to define the time period, and an indication if use is allowed or disallowed in the time period.

The subscriber for device data 110 comprises the subscriber identifier as a primary key and a foreign key, and a device identifier as a primary key and a foreign key. In an example data set wherein the subscriber identifier identifies the minor, the device identifier may identify the client device 36.

The device data 112 comprises the device identifier as a primary key and a model number. For example, the model number may comprise a model number of the client device 36.

The device time usage data 132 comprises a time period identifier as a primary key, the device identifier as a primary key and a foreign key, a start time and an end time to define the time period, and an indication if use is allowed or disallowed in the time period.

The chat room list data 114 comprises a personalized list identifier as a primary key, the subscriber identifier as a primary key and a foreign key, a chat room identifier as a foreign key, and an indication if the chat room list is a white list.

The rating data 116 comprises the rating identifier as a primary key, a description and a rating display.

The chat room data 120 comprises the chat room identifier as a primary key, a description, and the rating identifier as a foreign key.

The policy data 124 comprises the subscriber identifier as a primary key and a foreign key, a policy identifier as a primary key, an action type as a foreign key, and a custom policy property. The policy data 124 defines the policies that are to be enforced, such as by the policy engine 71 of the client device 36.

The action list data 126 comprises the action type as a primary key and an action description. The action list data 126 is a catalog of types of predetermined actions that can be performed by the client device 36 based on events. For example, an action may comprise "send e-mail to administrator when a message is blocked" or "send IM to administrator when the subscriber logs on to the service".

The action log data 130 comprises the subscriber identifier as a primary key and a foreign key, an action identifier as a primary key, the action type as a foreign key, an indicator of whether or not the action is completed, a time that the action was completed, and an action result. Actions taken in accordance with the policies are logged in the action log data 130. The action log data 130 may be periodically updated based upon data received from the policy engine 71 of the client device 36 by the IM server 64.

Those having ordinary skill will recognize that the herein-disclosed computer-implemented acts can be directed by computer-readable program code stored by a computer-readable medium. Examples of the computer-readable medium include, but are not limited to, a magnetic medium such as a hard disk or a floppy disk, an optical medium such as an optical disk (e.g. a CD or a DVD), or an electronic medium such as an electronic memory (e.g. a computer's internal memory or a removable memory such as a memory card). The IM service registration server 20 and the IM server 64 comprise a computer to perform the computer-implement acts.

It will be apparent to those skilled in the art that the disclosed inventions may be modified in numerous ways and may assume many embodiments other than the preferred forms specifically set out and described herein.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a request from a parent or guardian of a minor to sign up for an Instant Messaging (IM) service on behalf of the minor at a server;
   providing a Web-based profile administrator interface to the parent or guardian;
   receiving a profile, created by the parent or guardian using the Web-based profile administrator interface, that comprises one or more control policies for usage of the IM service by the minor at the server;
   receiving a request from the minor to log on to the IM service using a client device; and
   communicating information from the profile associated with the minor to the client device to modify the functionality of the client device by installing a plug-in to comply with at least one policy in the profile.

2. The method of claim 1 further comprising:
using a policy engine of the client device to limit usage of the IM service to the minor based on the at least one policy.

3. The method of claim 2 wherein the policy engine comprises the plug-in for an instant messaging client.

4. The method of claim 1 further comprising:
using a policy engine of the client device to inhibit usage of the IM service to the minor based on the at least one policy.

5. The method of claim 4 wherein the policy engine comprises the plug-in for an instant messaging client.

6. The method of claim 1 further comprising:
using a policy engine of the client device to allow usage of the IM service to the minor based on the at least one policy.

7. The method of claim 6 wherein the policy engine comprises the plug-in for an instant messaging client.

8. The method of claim 1 wherein the at least one policy indicates specific times when messages from members of a buddy list for the minor are to be blocked or allowed.

9. The method of claim 1 wherein the at least one policy indicates specific times when messages from anyone not in a buddy list for the minor are to be blocked or allowed.

10. The method of claim 1 further comprising:
collecting information for a log of actions taken by the client device to comply with the at least one policy.

11. A system comprising:
a first server to receive a request from a parent or guardian of a minor to sign up for an Instant Messaging (IM) service on behalf of the minor, to provide a Web-based profile administrator interface to the parent or guardian, and to receive a profile, created by the parent or guardian using the Web-based profile administrator interface, that comprises one or more control policies for usage of the IM service by the minor; and
a second server to receive a request from the minor to log on to the IM service using a client device, and to communicate information from the profile associated with the minor to the client device to modify functionality of the client device by installing a plug-in to comply with at least one policy in the profile.

12. The system of claim 11 wherein the client device comprises a policy engine to limit usage of the IM service to the minor based on the at least one policy.

13. The system of claim 12 wherein the policy engine comprises the plug-in for an instant messaging client.

14. The system of claim 11 wherein the client device comprises a policy engine to inhibit usage of the IM service to the minor based on the at least one policy.

15. The system of claim 14 wherein the policy engine comprises the plug-in for an instant messaging client.

16. The system of claim 11 wherein the client device comprises a policy engine to allow usage of the IM service to the minor based on the at least one policy.

17. The system of claim 16 wherein the policy engine comprises the plug-in for an instant messaging client.

18. The system of claim 11 wherein the at least one policy indicates specific times when messages from members of a buddy list for the minor are to be blocked or allowed.

19. The system of claim 11 wherein the at least one policy indicates specific times when messages from anyone not in a buddy list for the minor are to he blocked or allowed.

20. The system of claim 11 wherein the second server is to collect information for a log of actions taken by the client device to comply with the at least one policy.

* * * * *